United States Patent [19]
Floyd et al.

[11] Patent Number: 6,103,308
[45] Date of Patent: Aug. 15, 2000

[54] PAPER COATING LUBRICANT

[75] Inventors: William Floyd, Chester; Doug Harper, Columbia; Nolan Thompson, Rock Hill, all of S.C.

[73] Assignee: GenCorp Inc., Fairlawn, Ohio

[21] Appl. No.: 09/065,266

[22] Filed: Apr. 23, 1998

[51] Int. Cl.[7] .................................................. B05D 3/12
[52] U.S. Cl. .................... 427/363; 427/364; 427/366; 162/136; 162/179
[58] Field of Search ..................... 427/363, 364, 427/366; 162/136, 179

[56] References Cited

U.S. PATENT DOCUMENTS

| | | | |
|---|---|---|---|
| 2,331,922 | 10/1943 | Montgomery | 117/64 |
| 2,691,606 | 10/1954 | Ziliox et al. | 117/65 |
| 3,066,039 | 11/1962 | Tienda y Ricon et al. | 106/243 |
| 3,108,889 | 10/1963 | Miranda et al. | 106/142 |
| 3,328,184 | 6/1967 | Weber | 106/130 |
| 3,928,707 | 12/1975 | Lauterbach et al. | 428/342 |
| 4,676,836 | 6/1987 | Hill et al. | 106/243 |
| 4,766,015 | 8/1988 | Nikoloff et al. | 427/326 |
| 5,122,188 | 6/1992 | Erhan et al. | 106/28 |
| 5,229,023 | 7/1993 | Landis | 252/57 |
| 5,527,383 | 6/1996 | Flynn et al. | 106/243 |
| 5,698,076 | 12/1997 | Van Phan et al. | 162/111 |
| 5,713,990 | 2/1998 | Erhan et al. | 106/31.35 |

FOREIGN PATENT DOCUMENTS

| | | |
|---|---|---|
| 2-200899 | 8/1990 | Japan . |
| 9600815 | 1/1996 | WIPO . |

OTHER PUBLICATIONS

Eriksen, Research Disclosure, No.392, p. 772, 39217, 1996.

*Primary Examiner*—Erma Cameron
*Attorney, Agent, or Firm*—Robert F. Rywalski

[57] ABSTRACT

An aqueous paper and paperboard coating composition is provided containing as a lubricant a vegetable oil triglyceride which is hydrophobic and non-ionic.

12 Claims, No Drawings

PAPER COATING LUBRICANT

BACKGROUND OF THE INVENTION

Paper coating lubricants are designed to provide improved coating application rheology on blade, air knife and roll type coaters. Lubricants are essential in providing release of the coated surface from the calendars on glossy grades.

New application methods in coating (film coaters and short dwell coaters) and calendering (hot gloss and hot soft nip calendars) have changed the coating application parameters for lubricant utilization. Film coaters and short dwell coaters are generally limited to formulations of 56–58% solids due to low and high shear rheology problems. In film coater applications, an improved release of the wet coating film from the applicator roll is necessary at higher coater speeds to avoid picking and release patterns which are known as "orange peel" and "mottle".

Paper coating lubricants have been grouped into four categories: (1) aqueous dispersions of metallic soaps, (i.e., calcium stearate), (2) wax emulsions (paraffin, microcrystalline and oxidized polyethylene waxes), (3) blends of calcium stearate, a polyethylene glycol fatty ester, urea and possibly polysaccharides, and (4) soy lecithin/oleic acid blends. Each of these products have advantages for certain applications, but all have been found lacking in high-speed or high temperature situations. Additionally, these lubricants display poor rheology under the extremely high shear experienced when paper coating machines run at speeds near or beyond 4500 feet per minute. Also, many paper mills require the chemicals used in their formulations to be on the list of additives approved for use in paper coatings with food contact applications.

Calcium stearate, lecithin/oleic acid and polyethylene lubricants generally increase the viscosity of coatings through chemical interactions with starch, latex, calcium ions and other additives. Importantly, these products have been found to undergo thermal degradation when used on hot gloss or hot soft nip calendars. This degradation manifests itself as "smoking" or "hazing" on the machine in the vicinity of the hot roll.

DETAILED DESCRIPTION

It has been found that vegetable oil triglycerides, in particular, refined vegetable oils used for frying food, such as peanut, corn, sunflower, olive, canola, and soya bean oils are useful as paper coating lubricants. These triglycerides are FDA-approved for food applications and in paper coatings. In a paper coating they were found not to display a viscosity increase, as do some other lubricants. These oils generally have a smoke-point of at least 350° to 425° F., which is significantly higher than that of various other lubricant formulations. This allows manufacturers to increase the amount of lubricant present for improved coating film release and lubricity of dried coatings on hot calender rolls. Additionally, coating compositions containing the vegetable oil triglycerides as a lubricant are not sensitive to calcium ion, as are lubricant formulations containing oleic acid.

The vegetable oil triglyceride is hydrophobic and non-ionic and generally has a composition containing at least 90% triglyceride, less than 5% free fatty acids, and iodine value of between 120 and 150. Preferably the vegetable oil contains at least 99.9% of unmodified triglycerides and less than 0.05% free fatty acids. Generally the paper coating lubricant contains at least 35% solids, preferably 45 to 55% solids. When the paper coating lubricant is emulsified, about 30 to 97% of the solids preferably 60 to 90% of the solids portion is the vegetable oil triglyceride.

The vegetable oil triglyceride is preferably utilized in the paper coating lubricant in an emulsified state. This is carried out by emulsifying the triglyceride in water with a starch derivative or other non-ionic emulsifying agent. The starch derivative is preferably a lipophilic polysaccharide. Generally 3 to 70%, preferably 10 to 40% (solids basis) of a starch derivative is incorporated into the lubricant composition. Of particular utility for preparing such emulsions are starch derivatives described as "lipophilic starch" which is a starch, preferably waxy, which has been substituted with a lipophilic (oil loving) appendage which may be derived from an alkenyl succinic anhydride (ASA) or an alkyl ketene dimer (AKD), such as Amiogum 20®, a lipophilic waxy starch product of Cerestar, formerly American Maize Co., or National 912, a lipophilic waxy starch product of National Starch and Chemical Co. Such starches are also food-grade additives. They are compatible with paper coating additives, do not retrograde and are reactive with starch insolubilizer resins, which will reduce their water sensitivity when the paper coating is dried. The lipophilic starch offers advantages over conventional surfactants in that there is less rewetting of the finished coated paper or paperboard product, that is the finished paper is less water sensitive with less migration of ink and/or water.

The emulsified triglycerides as utilized herein are dilutable in water or in dilute aqueous coating formulations as used on a size press. Unemulsified oils are not suitable for this purpose, as they do not disperse in dilute aqueous formulations and subsequently "oil out"; causing mottle, streaking and runability problems.

Starch-based emulsions of triglycerides are also stable to dilution in aqueous formulations containing calcium ions. This solves a problem experienced with oleic acid-based lubricants or lubricants containing anionic surfactants, when used in hard water systems. This invention will also improve printability in situations where calcium carbonate is used as a filler or pigment in the paper, or calcium ion is leached into the system or introduced when recycled paper (broke) is repulped.

In a typical paper or paperboard coating composition the formulations will comprise water, pigment (eg. clay, titanium dioxide, calcium carbonate), binder (eg. starch, latex), water and the lubricant. Generally the coating composition has a solids level of at least 45% preferably 50 to 65% and the lubricant is incorporated at a level of 0.3 to 2% of the composition. For water box, size press or spray applications solids may range from 0.25% to 50%.

The paper lubricant of this invention is suitable for use on high-temperature calendar rolls which alleviates a smoking or hazing problem seen with other lubricants having a lower smoke point. The lubricant is not sensitive to calcium ion, as are lubricants containing free fatty acids, such as oleic acid, and does not contain grit as with calcium stearate. The lubricant can also be emulsified at neutral pH, and does not require a high pH, as with calcium stearate. The coating composition containing the lubricant also has a lower make-up viscosity and a high shear rheology wherein the flow viscosity of the coating is maintained under shear and reduces or eliminates dusting as may be experienced with a calcium stearate lubricant. These characteristics offer unique advantages over prior art lubricants.

In the process for coating paper and paperboard the paper coating composition is applied by any variety of coaters which uniformly spreads the coating composition onto a sheet of paper or paperboard. Common coaters include brush coaters, roll coaters, air brush coaters, size press, blade coaters and air knife coaters. Advantageously, the lubricant of the paper coating composition of this invention facilitates the spreading of the coating by the coater. After coating the coated paper or paperboard is dried. Conventional drying methods include festoon drying, conveyor drying, arch drying and wheel drying. Typically temperatures during drying range from 90° F. to 300° F. and higher.

The dried paper or paperboard is then subject to a finishing operation by calendering to improve the appearance and printing surface of the coated paper or paperboard. It is in the calendering step that the addition of the lubricant is critical to allow the coated paper or paperboard to stand up to the smoothing action of the supercalender, while aiding in the release of the coated paper or paperboard from the hot roll. In the supercalender the paper is subjected to high temperatures, generally from 150° F. to 500° F. and high pressures, generally from 1,000 to 2,000 pounds per linear inch (pli). The lubricant in the coating composition of this invention is particularly suited for high temperature calender rolls, eg. greater than 350° F., which is significantly higher than the smoke point of other lubricants (eg. prior art lubricant methyl oleate has a smoke point at 275° F., and calcium stearate has a smoke point of 302° F.)

EXAMPLE 1

To a 2 liter resin kettle was charged 754 grams of water and 103 grams of Amiogum 20®. This was heated to 90° C. for 30 minutes to solubilize the starch. To this starch solution was added 643 grams of soya bean oil (containing 99.9+% triglycerides). The mixture readily separated, so agitation was necessary until it could be homogenized. A homogenizer was set up with 500 pounds of pressure on the second stage, 2000 pounds on the first stage for 2500 pounds total pressure. Homogenization afforded a white emulsion which had a viscosity the next day of 260 cps, and 47% solids. A biocide was added after cooling below 40° C.

EXAMPLE 2

The procedure in Example 1 was repeated using corn oil (99.9+% triglycerides) in place of soya bean oil with similar results. Solids: 49.4%, viscosity: 590 cps.

EXAMPLE 3

The procedure in Example 1 was repeated with peanut oil (99.9+% triglycerides) in place of soya bean oil with similar results. Solids: 47.0%, viscosity: 320 cps.

EXAMPLE 4

The procedure in Example 1 was repeated using sun flower oil (99.9+% triglycerides) in place of soya bean oil with similar results. Solids: 48.4%, viscosity: 500 cps.

EXAMPLE 5

The procedure in Example 1 was repeated using olive oil (99.9+% triglycerides) in place of soya bean oil with similar results. Solids: 44.3%, viscosity: 340 cps.

EXAMPLE 6

A series of coating formulations was prepared to evaluate the performance of a liquid vegetable oil as a lubricant compared to several commercially-used products. The coating formulations were prepared as follows:

| Ingredient | 1 | 2 | 3 | 4 | 5 | 6 | 7 |
|---|---|---|---|---|---|---|---|
| Delaminated Clay | 50 | 50 | 50 | 50 | 50 | 50 | 50 |
| #2 Clay | 50 | 50 | 50 | 50 | 50 | 50 | 50 |
| Styrene-butadiene latex | 8 | 8 | 8 | 8 | 8 | 8 | 8 |
| Hydroxyethylated starch | 9 | 9 | 9 | 9 | 9 | 9 | 9 |
| Fatty ester | — | 1 | | | | | |
| Sulfated tall oil | | | 1 | | | | |
| Sulfated oleic acid | | | | 1 | | | |
| Calcium stearate | | | | | 1 | | |
| Lecithin/oleic acid blend | | | | | | 1 | |
| Soya bean oil | | | | | | | 1 |
| Insolubilizer (blocked glyoxal resin Sequarez 755) | .36 | .36 | .36 | .36 | .36 | .36 | .36 |
| % solids: | 61 | 61 | 61 | 61 | 61 | 61 | 61 |
| Brookfield Visc, (cps) Initial 100° F. | | | | | | | |
| 20 rpm, 1000's | 5 | 5.3 | 9.9 | 10.3 | 9.3 | 8.9 | 6.5 |
| 100 rpm, 1000's | 1.68 | 1.66 | 2.82 | 3.18 | 2.94 | 2.52 | 2.12 |
| 4 hour (100° F.) | | | | | | | |
| 20 rpm, 1000's | 4.8 | 4.9 | 10.4 | 11.4 | 8.2 | 8.6 | 5.7 |
| 100 rpm, 1000's | 1.54 | 1.52 | 3.16 | 3.34 | 2.68 | 2.72 | 1.84 |

The above data show that the vegetable oil in Formulation 7 is a compatible component with common paper coating additives, and affords a coating with a lower viscosity than most other commonly used lubricants of prior art. Such lower viscosity is significant in that it may allow the coating to be prepared at higher solids, which will lessen the amount of water to be removed in order to dry the sheet. These coatings were applied to a 50 lb. base stock sheet using a blade coater producing a dry coat weight of 7.5 lb./3300 sq. ft. These sheets were calendered up to 4 nips (cotton to steel), 600 psi and 150° F. The following table displays the test data for these sheets.

| Property | 1 | 2 | 3 | 4 | 5 | 6 | 7 |
|---|---|---|---|---|---|---|---|
| Brightness, sheet (4 nips) | 76.7 | 77.1 | 77.4 | 77.5 | 77.5 | 77.7 | 77.0 |
| % retained: K & N | 89.9 | 89.1 | 88.7 | 88.8 | 89.1 | 90.0 | 90.0 |
| Croda Ink | 79.9 | 78.8 | 76.5 | 75.5 | 76.5 | 74.4 | 78.2 |
| Gloss (75° meter) | | | | | | | |
| Sheet - 1 nip | 29.4 | 40.51 | 25.4 | 37.6 | 25.0 | 26.9 | 28.6 |
| 2 nips | 39.0 | 38.1 | 38.0 | 35.0 | 36.8 | 37.4 | 40.6 |
| 3 nips | 43.1 | 41.0 | 38.3 | 39.4 | 37.7 | 40.0 | 44.3 |
| 4 nips | 44.1 | 44.3 | 38.3 | 41.2 | 39.5 | 39.5 | 46.1 |
| Printed Ink | | | | | | | |
| 1 nip | 72.0 | 76.4 | 68.4 | 72.5 | 67.9 | 66.3 | 67.9 |
| 2 nips | 75.0 | 74.3 | 75.3 | 73.8 | 75.0 | 72.9 | 75.3 |
| 3 nips | 79.7 | 76.2 | 74.7 | 76.5 | 76.2 | 76.1 | 78.5 |
| 4 nips | 78.7 | 78.6 | 75.5 | 77.3 | 76.0 | 74.8 | 79.5 |
| IGT Dry Pick (VVP) (MV Oil, 2.5 m/s) | 79 | 85 | 85 | 85 | 98 | 91 | 91 |
| Coef. Of Friction | | | | | | | |
| 1 nip | .344 | .325 | .325 | .325 | .306 | .306 | .306 |
| 2 nips | .344 | .325 | .344 | .344 | .306 | .306 | .315 |
| 3 nips | .344 | .325 | .325 | .325 | .306 | .306 | .306 |
| 4 nips | .344 | .325 | .306 | .287 | .306 | .306 | .306 |

The above performance data show that the soya bean oil in formulation #7 affords properties equal to or better than those shown by prior art lubricants. The properties tested are ones that are most affected by the type of lubricant. This equal or better performance, coupled with a significantly higher smoke point than current lubricants, and food grade status affords a paper coating additive with a combination of unexpected benefits.

EXAMPLE 7

A sample of the emulsion prepared in Example 1 was diluted in deionized water to a concentration of 0.3% and allowed to stand for one week. It remained dispersed and did not "oil out", form layers or build up on the sides of the jar. The same emulsion was diluted to 0.25% in a 0.5% solution of calcium nitrate. It also remained dispersed for a week.

In contrast to the above, a lecithin/oleic acid emulsion was diluted to 0.25% in deionized water. It separated within a day and formed a layer on the surface. The same lecithin/oleic acid emulsion was diluted to 0.3% in 0.5% calcium nitrate. It separated and formed an oily residue on the sides of the jar.

EXAMPLE 8

A series of coating formulations were tested to evaluate the viscosity and high shear viscosity performance of the lubricant of Example 1 compared to calcium stearate and a coating with no lubricant.

| Ingredient Parts | Control | Calcium Stearate | Lubricant of Example 1 |
| --- | --- | --- | --- |
| Delaminated Clay | 40 | 40 | 40 |
| Calcined Clay | 10 | 10 | 10 |
| No. 2 Clay | 50 | 50 | 50 |
| Ethylated Starch | 4 | 4 | 4 |
| Styrene Butadiene Latex | 8 | 8 | 8 |
| Insolubilizer (glyoxal based) | .12 | .12 | .12 |
| (CMC) Carboxymethyl cellulose | .15 | .15 | .15 |
| Example 1 Lubricant | — | — | 1.25 |
| Calcium Stearate | — | 1.25 | — |
| Percent Solids | 58 | 58 | 58 |
| pH(NH$_4$O$_4$) | 8.0 | 8.0 | 8.0 |
| Brookfield Viscosity (cps) 100° F. No. 5 Spindle Initial | | | |
| 20 rpm | 1200 | 1300 | 1100 |
| 100 rpm | 375 | 460 | 365 |
| 4 Hour | | | |
| 20 rpm | 1375 | 1575 | 1210 |
| 100 rpm | 475 | 540 | 412 |
| Hercules High Shear 100° F. E-Bob Apparent Newtonian Viscosity, N 4400 rpm 400,000 Spring set | | | |
| Initial | 43.2 | 33.3 | 28.0 |
| 4 Hour | 36.3 | 32.3 | 30.6 |

The Brookfield Viscosity measurement shows a lower coating viscosity with Example 1 lubricant. The lower viscosity improves application of the coating by being easier to apply the coating to the sheet, or the lower viscosity can be used to increase solids providing for less water removal in the drying step.

The Hercules High Shear Viscosity tests the rheology of the coating formulation as would be experienced under high shear conditions found when coating is applied to a rapidly moving web of paper. The lower high shear viscosity of coating with the Example 1 lubricant indicates the coating is more readily and uniformly applied under high shear.

What is claimed:

1. A process for coating paper and paperboard comprising uniformly applying to a sheet of paper or paperboard an aqueous coating composition comprising water, a pigment, a binder and a lubricant, the lubricant comprising a vegetable oil triglyceride which is hydrophobic and non-ionic;

drying the coated paper or paperboard; and calendering the dried paper or paperboard.

2. Process of claim 1 wherein the vegetable oil is emulsified.

3. Process of claim 2 wherein the triglyceride is emulsified in water with a lipophilic starch derivative.

4. Process of claim 3 wherein the vegetable oil triglyceride contains at least 90% of unmodified triglycerides and less than 5% free fatty acids.

5. Process of claim 4 wherein the vegetable oil triglyceride is a vegetable oil having a smoking point of at least 350° F.

6. Process of claim 5 wherein the lubricant has a solids content of at least 35%.

7. Process of claim 6 wherein the lubricant comprises 0.03 to 2% of the coating composition.

8. Process of claim 3 wherein the starch derivative is a waxy, lipophilic-modified polysaccharide.

9. Process of claim 4 wherein the solids portion of the emulsified lubricant comprises 30 to 97% of the vegetable oil triglyceride and 3 to 70% of the starch derivative.

10. Process of claim 9 wherein the vegetable oil triglyceride contains at least 99.9% of unmodified triglycerides and less than 0.05% free fatty acids.

11. Process of claim 10 wherein the lubricant has a solids content of 45 to 55%.

12. Process of claim 5 wherein calendering is carried out at a temperature of at least 350° F.

* * * * *